United States Patent
Johnson et al.

(10) Patent No.: US 9,336,021 B2
(45) Date of Patent: May 10, 2016

(54) CONFIGURING APPLICATIONS AT RUNTIME

(71) Applicant: Wal-Mart Stores, Inc., Bentonville, AR (US)

(72) Inventors: Brian M Johnson, Santa Clara, CA (US); Prashant Dighe, Santa Clara, CA (US); Bhanu Cherukumille, Fremont, CA (US); Tanuja Phadke, San Jose, CA (US); Soumen Sarkar, San Jose, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 14/230,904

(22) Filed: Mar. 31, 2014

(65) Prior Publication Data

US 2015/0277939 A1    Oct. 1, 2015

(51) Int. Cl.
*G06F 9/44*     (2006.01)
*G06F 15/177*   (2006.01)
*G06F 9/445*    (2006.01)

(52) U.S. Cl.
CPC .............. *G06F 9/44505* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 6,381,639 B1* | 4/2002 | Thebaut et al. | 709/222 |
| 6,968,380 B1* | 11/2005 | Singhal | H04L 67/02 709/222 |
| 8,874,888 B1* | 10/2014 | Beda et al. | 713/2 |
| 2002/0147972 A1* | 10/2002 | Olmeda et al. | 717/174 |
| 2007/0157172 A1* | 7/2007 | Zenz et al. | 717/121 |
| 2009/0144698 A1* | 6/2009 | Fanning et al. | 717/120 |
| 2010/0049959 A1* | 2/2010 | Arcese et al. | 713/1 |

OTHER PUBLICATIONS

Diane Tang, Ashish Agarwal, Deirdre O'Brien, Mike Meyer, Proceedings 16th Conference on Knowledge Discovery and Data Mining, ACM, Washington, DC (2010), pp. 17-26, Overlapping Experiment Infrastructure: More, Better, Faster Experimentation http://research.google.com/pubs/archive/36500.pdf.
Ari Grant and Kang Zhang, Airlock—Facebook's mobile A/B testing framework, Posted About 3 Months Ago https://code.facebook.com/posts/520580318041111/airlock-facebook-s-mobile-a-b-testing-framework/.

* cited by examiner

*Primary Examiner* — James D Rutten
(74) *Attorney, Agent, or Firm* — Bryan Cave

(57) ABSTRACT

The present invention is generally directed to methods, systems, and computer program products for configuring applications at runtime. Embodiments of the invention decouple code and configuration. Application configuration is externalized, allowing configuration to be composed at runtime based on client context. A client context for an application is sent to a configuration manager. One or more pluggable configuration providers at the configuration manager deduce values for use in configuring the application at runtime. Deduced values are composed into a configuration and the configuration returned to the application. Using the values in the composed configuration, the application can be configured to operate in the client context.

33 Claims, 7 Drawing Sheets

CONFIGURING APPLICATIONS AT RUNTIME

CROSS-REFERENCE TO RELATED APPLICATIONS

Not Applicable.

BACKGROUND

1. Field of the Invention

This invention relates generally to the field of configuring applications, and, more particularly, to methods, systems, and computer program products for configuring applications at runtime based on context.

2. Related Art

Applications are often developed to operate in specified computing environments. For many applications, code and configuration are internally coupled within the application. As such, for these applications to operate in new computing environments, a developer may have to recode various portions of the application for compatibility with the new computing environment. That is, configuration for an application is fixed at development time.

Some compilers permit configuration changes at compile time through compiler commands. However, once an application is compiled (e.g., into an executable program), configured is essentially fixed. Further, an end user of an application may not have access to source code and/or a complier to facilitate compile time configuration changes.

The inability to use an application across diverse computing environments with requiring recoding and/or recompilation can be frustrating to end users. An end user can buy an application for use in a particular computing environment. However, over time, as technology advances, other systems are upgraded, new systems come online, etc., the end user's computing environment(s) can change. The end user may desire but be unable to use the application in the changed computing environments. Even if the application is functional, the application may not operate in an optimal fashion.

Some mechanisms have been developed to let users experiment by assigning alternate values to parameters depending on domain and layers. These mechanisms use parameter partitioning and associate subsets with layers of experiments. Other mechanisms use A/B testing to determine how different versions of an application perform. However, these are experimentation mechanisms and are typically used by developers and analysts.

BRIEF DESCRIPTION OF THE DRAWINGS

The specific features, aspects and advantages of the present invention will become better understood with regard to the following description and accompanying drawings where.

DETAILED DESCRIPTION

Figure 1:
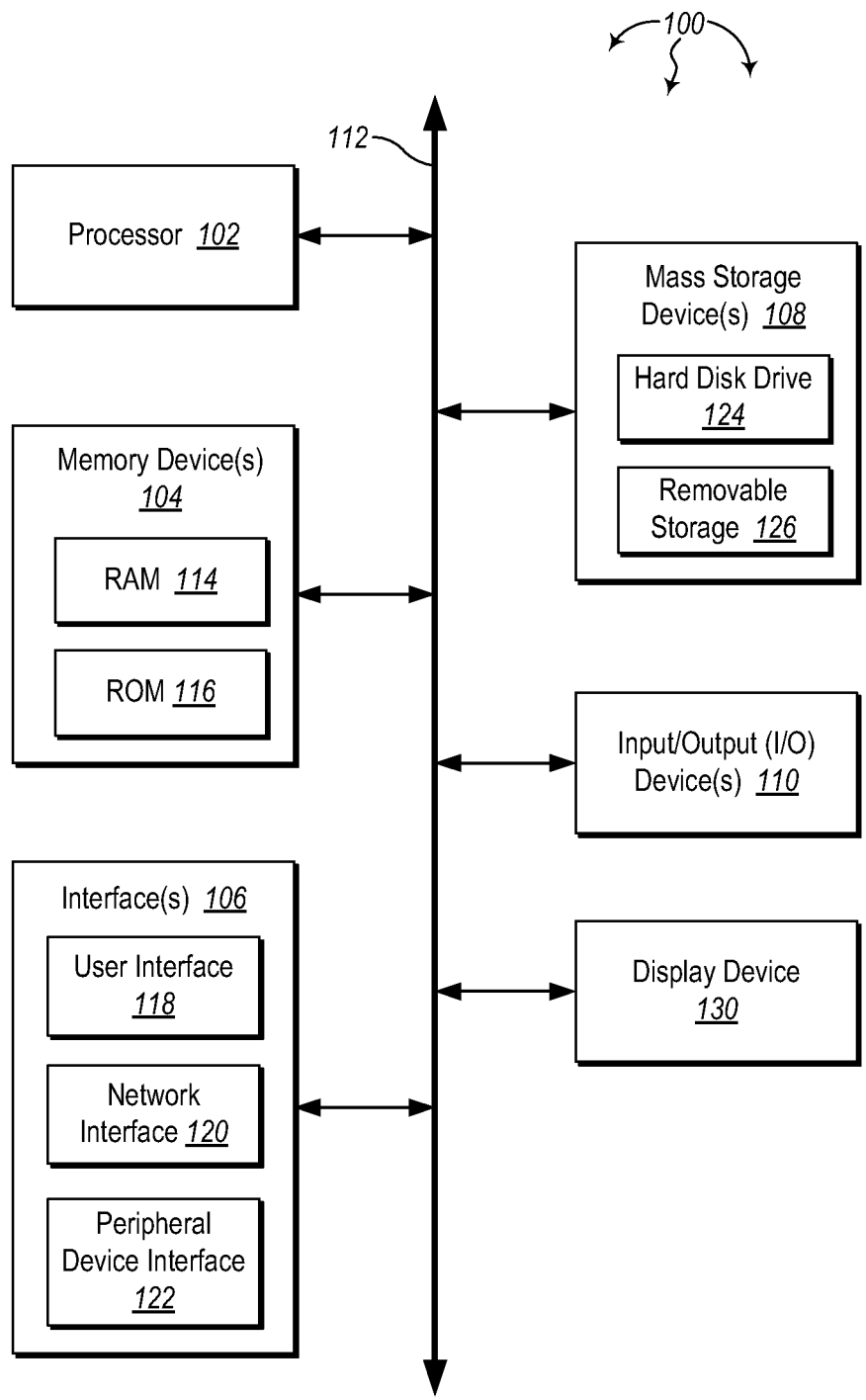
FIG. 1 illustrates an example block diagram of a computing device.

The present invention extends to methods, systems, and computer program products for configuring applications at runtime.

In the following description of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, kiosks, Point-Of-Sale ("POS") terminals, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

The present invention is generally directed to configuring applications at runtime. Embodiments of the invention decouple code and configuration. Application configuration is externalized, allowing configuration to be composed at runtime based on client context. A client context for an application is sent to a configuration manager. One or more pluggable configuration providers at the configuration manager deduce values for use in configuring the application at runtime. Deduced values are composed into a configuration and the configuration returned to the application. Using the values in the composed configuration, the application can be configured to operate in the client context.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
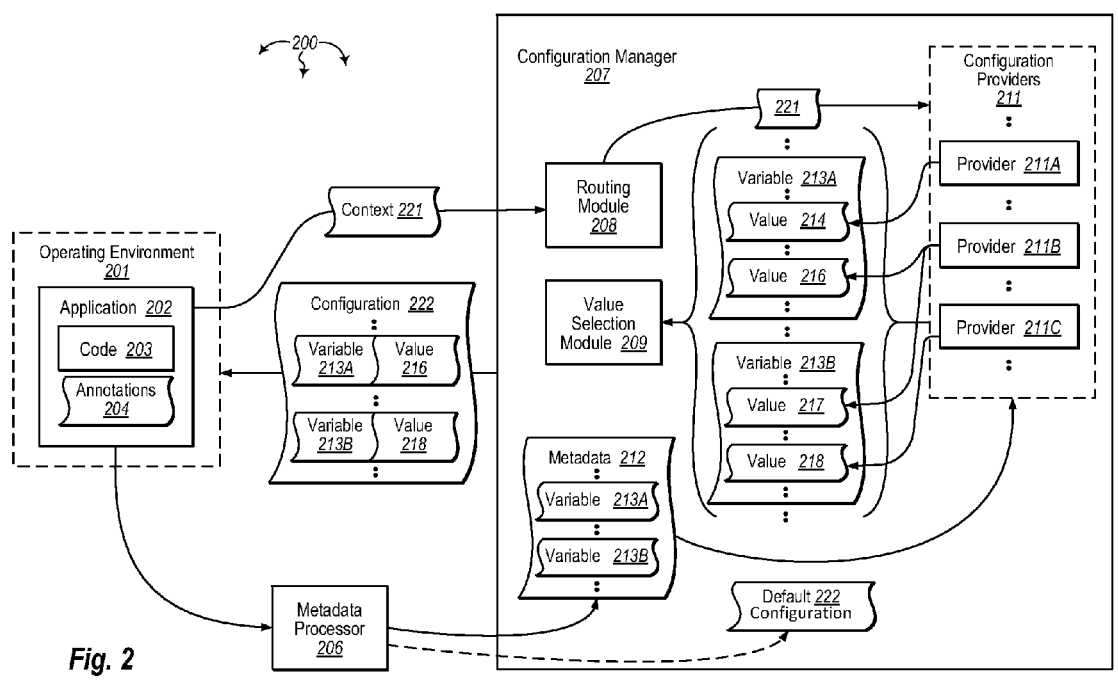
FIG. 2 illustrates an example computer architecture that facilitates configuring applications at runtime.

FIG. 2 illustrates an example computer architecture 200 that facilitates configuring applications at runtime. As depicted, computer architecture 200 includes operating environment 201, metadata processor 206, and configuration manager 207. Operating environment 201, metadata processor 206, and configuration manager 207 can be connected to (or be part of) a network, such as, for example, a PAN, a LAN, a WAN, and even the Internet. Operating environment 201, metadata processor 206, and configuration manager 207 can also be connected to a variety of other systems over the network. Accordingly, operating environment 201, metadata processor 206, and configuration manager 207, as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, application 202 (e.g., a cloud based electronic commerce application) is executing in (or, after appropriate configuration, is going to execute in) operating environment 201. Operating environment 201 can be defined by various different portions of context information, including a default context, a hardware context, a software context, a network connection context, a user identity context, a personalization context, etc. Application 202 can determine a context for operating environment 201. In some embodiments, context providers are used to assist application 202 when determining a context for operating environment 201. Application 202 send the determined context for operating environment 201 to configuration manager 207.

Different configurations for application 202 may be more or less optimal relative to one another depending on the context defining operating environment 201. As depicted, application 202 includes code 203 and annotations 204. Code 203 is executable code that, when executed, causes application 202 to perform various designed functionality. Annotations 204 represent one or more variables in metadata. The one or more variables can be assigned values to configure application 202 at runtime (e.g., for mobile vs Web). The metadata (and thus the one or more variables) is discoverable to other software modules with appropriate functionality.

Metadata processor 206 is configured to process application annotations, such as, for example, annotations 204, to identify metadata and corresponding configuration variables. Metadata processor 206 can indicate identified metadata and corresponding configuration variables to configuration manager 207. Metadata processor 206 can also determine a data types for each configuration variable.

Configuration manager 207 includes routing module 208, value selection module 209, and configuration providers 211. Routing module 208 can receive a context from an application. Routing module 208 can determine from a received context which configuration providers 211 to application for a specific code invocation. Routing module 208 can then route a received context to one or more determined configuration providers 211. Thus, different configuration providers can be selectively invoked to optimize and/or add additional control to code execution.

Each of the one or more configuration providers 211 (e.g., providers 211A, 211B, and 211C) can refer to application metadata to identify variables that are to be assigned values. Based on the received context, each of the one or more configuration providers 211 can deduce values for one or more of the identified variables. Each of the one or more configuration providers 211 can include algorithms that deduce values based on a received context. Configurations can be inherited and specialized based on contextual parameters, such as, for example, data center, availability zone, geographic location, etc. Providers (e.g., providers 211A, 211B, and 211C) can represent participation by any number of data sources, including user preferences, personalization systems, experimentation, locale, time zone, business rules, etc.

Generally, configuration providers are pluggable into and out of configuration manager 207. Configuration manager 207 can include a service provider interface that configuration providers use to hook into the other modules of configuration manager 207. As such, a developer can develop virtually any kind of configuration provider with virtually any type of rules and/or algorithms and can use the service provider interface to connect the configuration provider to configuration manager 207. If a configuration provider is to be removed for some reason, the configuration provider can be taken down without impacting the functionality of other configuration providers or the functionality of configuration manager 207.

Each of the one or more configuration providers 211 (e.g., providers 211A, 211B, and 211C) can send proposed values to value selection module 209. Value selection module 209 can apply (e.g., priority) rules to proposed values to select an appropriate value for each identified variable. For example, a priority system can be used to resolve conflicts between configuration providers. Values from higher priority configuration providers can be selected over values from lower priority configuration providers. Value selection module 209 can compose a configuration that includes each of the one or more variables along with corresponding selected values (e.g., name-value pairs). Value selection module 209 can return the composed configuration back to an application.

Figure 3:
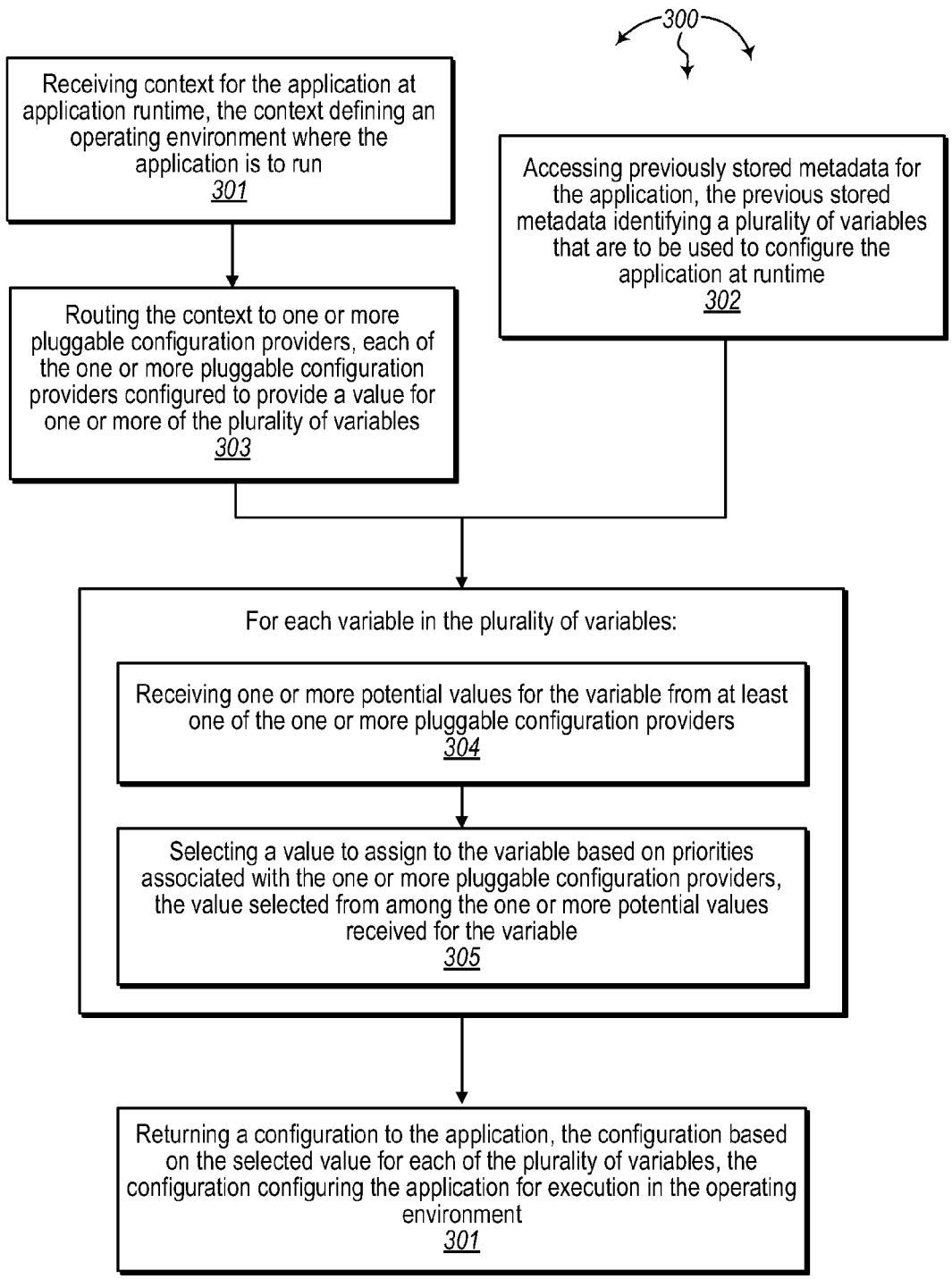
FIG. 3 illustrates a flow chart of an example method for configuring applications at runtime.

FIG. 3 illustrates a flow chart of an example method 300 configuring an application at runtime. Method 300 will be described with respect to the components and data of computer architecture 200.

Metadata processor 206 can access annotations 204. Metadata processor 206 can identify metadata 212 including variables 213A, 213B, etc. from annotations 204. Metadata processor 206 can also determine the data type of each of variables 213A, 213, etc. Metadata processor 206 can send metadata 212 to configuration manager 207. Configuration manager 207 can receive metadata 212 from metadata processor 206. Configuration manager 207 can store metadata 212.

In some embodiments, metadata processor 206 also creates default configuration 222. Default configuration 222 (or a portion thereof) can be returned to application 202 when configuration providers 211 are unable to generate values for one or more variables.

Application 202 can obtain (potentially with the help of one or more context providers) context 221 in response to a request to execute application 202. Context 221 can include various different portions of context information that define operating environment 201. Application 202 can send context 221 to configuration manager 207.

Method 300 includes receiving context for the application at application runtime, the context defining an operating environment where the application is to run (301). For example, routing module 208 can receive context 221 from application 202. As described, context 221 defines operating environment 201 (where application 202 is to run).

In some embodiments, context 221 can include user identity information identifying an entity (e.g., a person). The identity information can be used to access a separate user preference database used to store previous configuration settings for the entity. Further, even non-user-preference settings (e.g., 213A, 213B) can be enhanced into a user preference without modification to code 203 by adding data elements to the user preference system. Adding data elements allows application 202 to be enhanced with new user preferences without modification.

Various different types of information, such as, for example, a network address (e.g., an IP address) can be embedded and/or included within context 221. Embedded and/or included data can be used to provide locale, time zone, geographic, language, or cultural preferences.

Method 300 includes accessing previously stored metadata for the application, the previous stored metadata identifying a plurality of variables that are to be used to configure the application at runtime (302). For example, configuration providers 311 can access metadata 212. From metadata 212, configuration providers 311 can identify variables 213A, 213B, etc. (and their corresponding data types) that are to be used to configure application 202 at runtime.

Method 300 includes routing the context to one or more pluggable configuration providers, each of the one or more pluggable configuration providers configured to provide a value for one or more of the plurality of variables (303). For example, routing module 208 can route context 221 to one or more of configuration providers 211, including providers 211A, 211B, and 211C.

Each of providers 211A, 211B, 211C, etc. can deduce a value for one or more of variables 213A, 213B, etc. based on context 221. For example, providers 211A and 211B can deduce values 214 and 216 respectively for variable 213A. Similarly, providers 211B and 211C can deduce values 217 and 218 respectively for variable 213B. The deduced values can be formatted to appropriate data types defined in metadata 212. For example, values 214 and 216 can be formatted to match the data type of variable 213A. Similarly, values 217 and 218 can be formatted to match the data type of variable 213B. Configuration providers 211 can send the deduced values to value selection module 209.

Method 300 includes, for each variable in the plurality of variables, receiving one or more potential values for the variable from at least one of the one or more pluggable configuration providers (304). For example, value selection module 209 can receive values 214 and 216 for variable 213A from providers 211A and 211B respectively. Similarly, value selection module 209 can receive values 217 and 218 for variable 213B from providers 211B and 211C respectively.

Method 300 includes, for each variable in the plurality of variables, selecting a value to assign to the variable based on priorities associated with the one or more pluggable configuration providers, the value selected from among the one or more potential values received for the variable (305). For example, value selection module 209 can select value 216 for variable 213A and can selection value 217 for variable 213B. Value selection module 209 can select value 216 for variable 213A (from among values 214 and 216), based on provider 211B having a higher priority than provider 211A. Similarly, value selection module 209 can select value 218 for variable 213B (from among values 217 and 218), based on provider 211C having a higher priority than provider 211B.

Method 300 includes returning a configuration to the application, the configuration based on the selected value for each of the plurality of variables, the configuration for configuring the application to execute in the operating environment (306).

For example, configuration module 207 can return configuration 222 to application 202. Configuration 202 includes value 216 for variable 213A (e.g., a name-value pair) and includes value 218 for variable 213B (e.g., another name-value pair). Configuration manager 207 can compose configuration 222 from the values 216, 218, etc. selected by value selection module 209.

Application 202 can receive configuration 222 from configuration manager 207. During runtime, application 202 can assign value 216 to variable 213A and can assign value 218 to variable 213B to configure application 202 to execute in operating environment 201.

As such, embodiments of the invention can facilitate internationalization and localization of applications. Applications can be configured for use with different languages, regional differences and technical requirements of a target market. Applications can be configured without engineering changes.

Figure 4:
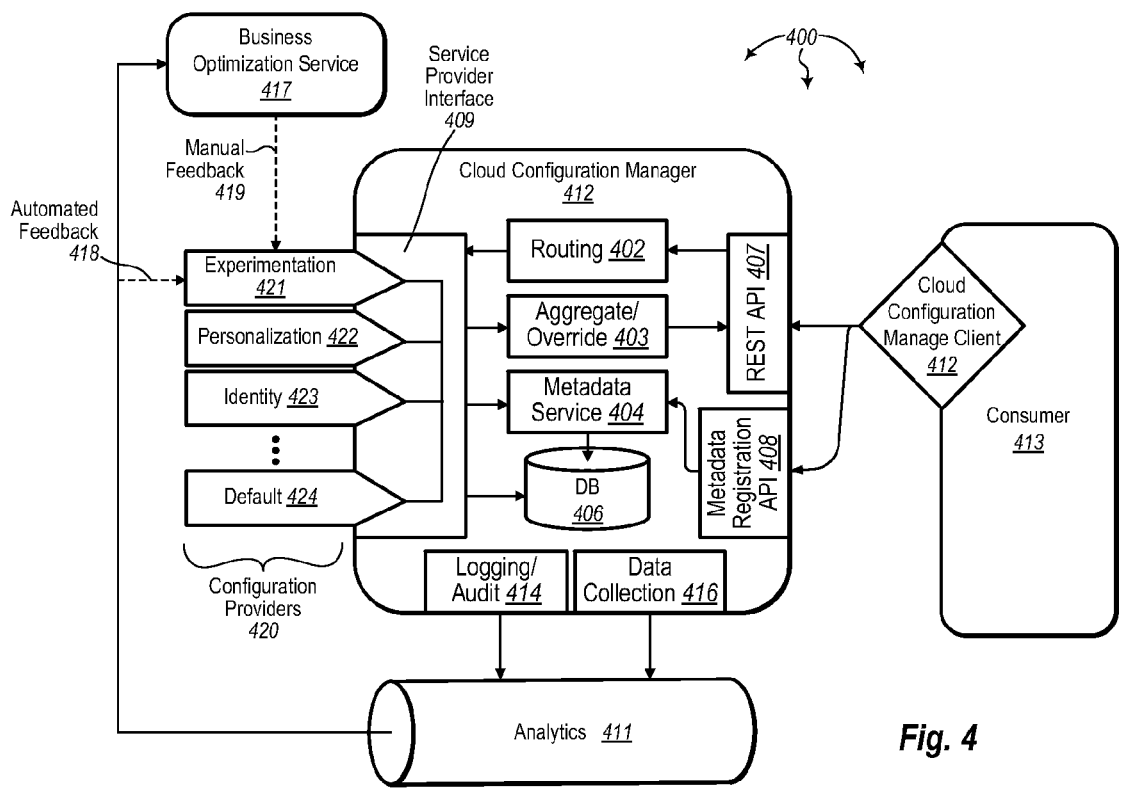
FIG. 4 illustrates an example computer architecture that facilitates configuring applications at runtime.

FIG. 4 illustrates an example computer architecture 400 that facilitates configuring applications at runtime. The components of computer architecture 400 can be connected to (or be part of) a network, such as, for example, a PAN, a LAN, a WAN, and even the Internet. The components of computer architecture 400 can also be connected to a variety of other systems over the network. Accordingly, the components of computer architecture 400, as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, computer architecture includes cloud configuration manager ("CCM") 401. CCM 401 further includes routing 402, aggregate/override 403, metadata service 404, database 406, rest API 407, metadata registration API 408, service provider interface (SPI) 409, logging/audit 414, and data collection 416. Configuration providers 420, including experimentation 421, personalization, 422, identity 423, default 424, etc., can plugin into CCM 401 through SPI 409.

Other examples of configuration providers include Emergency Operations/Network Operations Center (NOC)/Command Center "Override" service provider. A Command Center "Override" service provider can facilitate modification to configuration 222 by an operator for the purpose of managing an operational incident. In cases where the code 203 has a failure mode, a Command Center "Override" service provider can insert configuration values 216, 218 that are considered of the highest precedence by value selection module 209 and support the recovery in operations of the application 202. Supporting application recovery improves the business continuity, protecting revenue, providing safety enhancements, etc. Thus, one of more configuration providers 420 can be used to implement values 216, 218 with those values based on any portion of context 221, which can directly or indirectly be used to infer desirable behavior for application 202.

Consumer 413 includes CCM client 412 (e.g., a Java client). CCM client 412 can register metadata for consumer 413 (e.g., variables and data types) with metadata service 404 through metadata registration API 408. Metadata service 404 can store metadata for consumer 413 in database 406. CCM client 412 can sent a context to CCM 401 through rest API 407 to request a configuration for consumer 413.

Rest API 407 can receive requests for configurations from CCM client 412. Routing 402 can route configuration requests to one or more of configuration providers 420, selected from among experimentation 421, personalization, 422, identity 423, default 424, etc., The one or more of configuration providers 420 can return values (formatted in appropriate data types) to aggregate/override 403. Aggregate/override 403 can apply various rules and/or algorithms (potentially based on provider priorities) to select appropriate vales for consumer 413. CCM 401 can compose the application values into a configuration (e.g., name-value pairs). Rest API 407 can return the composed configuration to CCM client 412.

CCM client 412 can receive the composed configuration from rest API 407. CCM client 412 can use the composed configuration to configure consumer 413 to operate in the context.

Logging/Audit 414 can track values returned to consumer 413 in composed configurations. Data collection 415 can collect operational data as consumer 413 operates using different configurations. Logging/audit 414 can send tracked values to analytics 411. Similarly, data collection 416 can send tracked data to analytics 411. In some embodiments, consumer 413 can also sent operational data directly to analytics 411.

Analytics 411 can analyze tracked values and operational data to determine if composed configurations are resulting in acceptable operational outcomes for consumer 413. Analytics 411 can provide automated feedback 418 to experimentation plugin 421. Analytics 411 can also provide operational outcomes to business optimization service 417. One or more analysts at business optimization service 417 can review operational outcomes. Business optimization service 417 can provide manual feedback 419 to experimentation plugin 421.

Experimentation plugin 421 can use both automatic feedback 418 and manual feedback 419 to tune and/or experiment with configurations for consumer 413. A/B testing and/or multivariate testing can be conducted without having to re-code and re-deploy consumer 413.

Default provider 424 can present a user interface permitting an administrator to enter a default configuration for consumer 413. If there is a service failure among one or more other providers, default provider 424 can return the default configuration for consumer 413.

As such, a value set for a variable can vary between a default value 424, a user preference value, an experimentally determined value 421 or a personalized value 422 and back without having to rebuild and release code 203.

Providers can cache values for specified contexts. Thus, if a specified context is subsequently received again, the provider can access the values from cache.

Configuration providers 420 can be implemented to integrate code 203 with legacy systems and/or via remote service call via various different protocols, such as, for example, REST, Simple Object Access Protocol ("SOAP"), or other remote API (Remote Method Invocation ("RMI"), COBRA, etc.) invocation approaches.

SPI 409 can be a published API. As such, developers can develop additional configuration providers to plugin to SPI 409. Additional configuration providers allow configurations to be extended without interaction with the developer of consumer 413.

CCM 401 can maintain different configuration versions.

Figure 5:
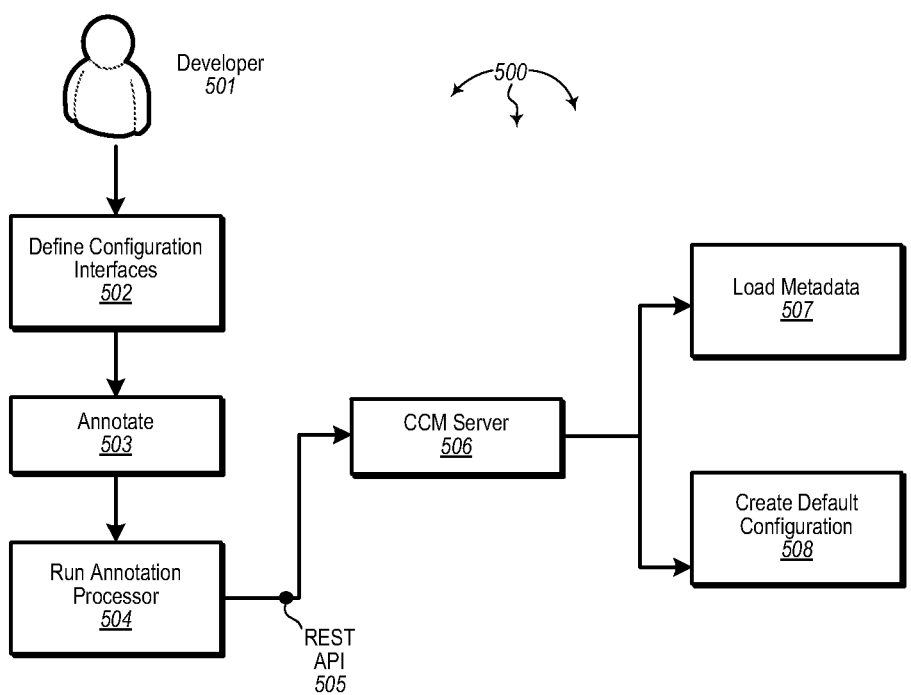
FIG. 5 illustrates a flow of an example for loading metadata and creating a default configuration for an application.

FIG. 5 illustrates a flow 500 of an example for loading metadata and creating a default configuration for an application. As depicted, developer 501 defines configuration interfaces 502. The configuration interfaces 502 are annotated 503. An annotation process is run 504. Output from the annotation processor is set through rest API 505 to CCM server 506. The output from the annotation processor can be used to load metadata 507 and creation default configuration 508.

Figure 6:
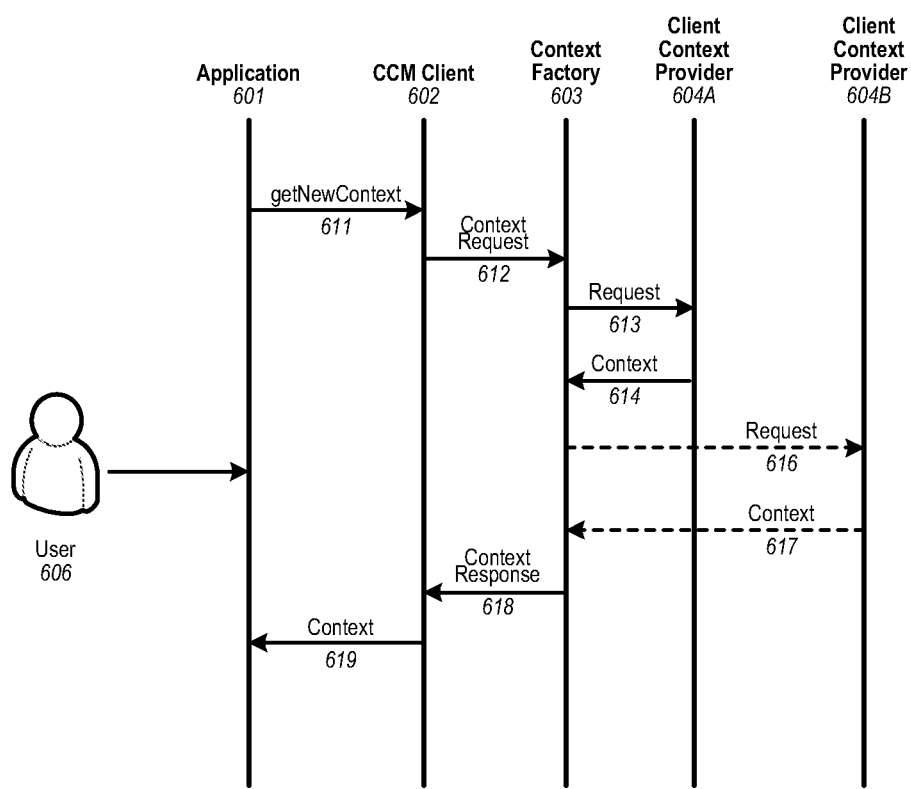
FIG. 6 illustrates a sequence diagram of an example for obtaining context for an application.

As described, context providers can be used to assist an application obtain a context for an operating environment. FIG. 6 illustrates a sequence diagram 600 of an example for obtaining context for an application. User 606 causes application 601 to send get new context 611 to CCM client 602. In turn, CCM client 602 sends context request 612 to context factory 603.

In response to context request 612, context factory 603 can request context from one or more client context providers. For example, context factory 603 sends requests 613 and 616 to client context providers 604A and 604N respectively. Client context providers 604A and 604N return context 614 and 617 respectively to context factory 603. In turn, context factory 603 returns context response 618 (containing both context 614 and 617) to CCM client 602. In turn, CCM client 602 returns context 619, representing both context 614 and 617, to application 601. Application 601 or CCM client 602 can then send context 619 to a CCM (e.g., CCM 401) to request a configuration for application 601.

Figure 7:
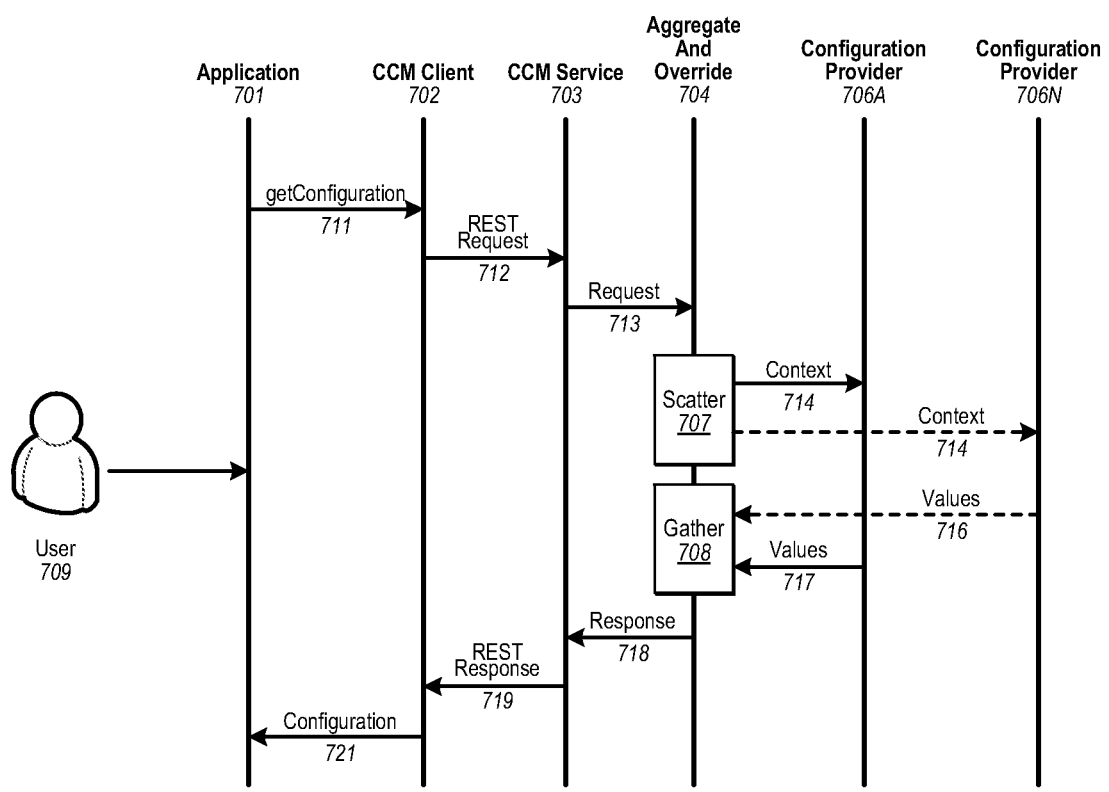
FIG. 7 illustrates a sequence diagram of an example for obtaining a configuration for an application.

FIG. 7 illustrates a sequence diagram 700 of an example for obtaining a configuration for an application. User 709 causes application 701 to send get configuration 711 (containing context 714) to CCM client 702. In turn, CCM client 702 sends rest request 712 (containing context 714) to CCM server 703. CCM service 703 routes corresponding request 713 (containing context 714) to aggregate and override 704. Aggregate and override 704 includes scatter 707 and gather 708.

Scatter 707 can send context 714 (or an appropriate portion thereof) to one or more configuration providers. For example, scatter 707 can send context 714 to configuration providers 706A and 706N. Configuration providers 706A and 706N can return values 716 and values 717 respectively to gather 708. Aggregate and override 704 can aggregate and/or override one or more of values 716 and values 717.

Aggregate and override 704 can send response 718 (containing aggregated and/or remaining (i.e., non-overridden) values) to CCM service 703. CCM service 703 can compose configuration 721 from the aggregated and/or remaining values. CCM service 703 can send REST response 719 (containing configuration 721) to CCM client 702. CCM client 702 can use configuration 721 to configure application 709 to operate in the environment of context 714.

In general, embodiments of the invention can be used to configure applications at runtime in a context sensitive manner. Different configurations can be applied for different contexts including but not limited to stability contexts, tuning contexts, and isolation contexts. Stability can be facilitated through rapid rollout of runtime configuration changes (parameter profile) known to have robust stability properties. Ongoing (and potentially automated) tuning can be facilitated (through parameter changes) based on closed loop feedback from a private cloud. Troublesome areas of an application cloud can be isolated through rapid runtime configuration changes.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. At a computer system, the computer system including one or more processors and system memory, a method for configuring an application, the method comprising:
   receiving context for the application at application runtime, the context defining an operating environment where the application is to run;
   accessing previously stored metadata for the application, the previously stored metadata identifying a plurality of variables that are to be used to configure the application at the application runtime;
   selecting one or more pluggable configuration providers based at least in part on the context;
   routing the context to the one or more pluggable configuration providers selected, each of the one or more pluggable configuration providers selected configured to deduce one or more potential values for one or more of the plurality of variables based at least in part on the context;
   for each variable in the plurality of variables:
      receiving the one or more potential values for the variable from at least one of the one or more pluggable configuration providers selected; and
      selecting a value of the one or more potential values to assign to the variable based at least in part on priorities associated with the one or more pluggable configuration providers selected;
   returning a configuration to the application, the configuration based at least in part on the value selected of the one or more potential values for each variable of the plurality of variables, the configuration for configuring the application to execute in the operating environment;
   tracking the value selected of the one or more potential values for each variable of the plurality of variables;
   collecting operational data based on the configuration;
   analyzing the operational data and the value tracked of the one or more potential values for each variable of the plurality of variables; and
   returning an updated configuration to the application, the updated configuration based at least in part on the analyzing the operational data and the value tracked of the one or more potential values for each variable of the plurality of variables.

2. The method of claim 1, wherein:
   receiving the context for the application at the application runtime comprises:
      receiving the context that was gathered by one or more client context providers.

3. The method of claim 1, wherein:
   receiving the context for the application at the application runtime comprises:
      receiving the context that identifies one or more of:
         a data center;
         an availability zone; or
         a geographic location associated with the application.

4. The method of claim 1, wherein:
   accessing the previously stored metadata for the application comprises:
      accessing the previously stored metadata indicating a data type for each variable of the plurality of variables.

5. The method of claim 1, further comprising composing a default configuration for the application from the previously stored metadata.

6. The method of claim 1, wherein routing the context to one or more pluggable configuration providers comprises routing the context to one or more of:
   an experimentation context provider;
   a personalization context provider; or
   an identity context provider.

7. The method of claim 1, further comprising composing the configuration from the values selected for each variable of the plurality of variables.

8. The method of claim 1, wherein:
   at least one of the one or more potential values comprises a value from an emergency configuration provider, the one or more pluggable configuration providers comprising the emergency configuration provider;
   and
   the emergency configuration provider comprises a highest priority of the priorities associated with the one or more pluggable configuration providers.

9. The method of claim 1, wherein:
   receiving the context for the application at the application runtime comprises receiving the context that identifies an availability zone associated with the application.

10. The method of claim 1, wherein:
    receiving the context for the application at the application runtime comprises receiving the context that identifies a geographic zone associated with the application.

11. The method of claim 1, wherein:
    analyzing the operational data and the value tracked of the one or more potential values for each variable of the plurality of variables comprises providing automated feedback; and
    the updated configuration is further based at least in part on the automated feedback.

12. The method of claim 1, wherein:
    analyzing the operational data and the value tracked of the one or more potential values for each variable of the plurality of variables comprises providing manual feedback from a business optimization service; and
    the updated configuration is further based at least in part on the manual feedback.

13. The method of claim 1, wherein:
    analyzing the operational data and the value tracked of the one or more potential values for each variable of the plurality of variables comprises providing automated feedback and providing manual feedback from a business optimization service; and
    the updated configuration is further based at least in part on the automated feedback and the manual feedback.

14. The method of claim 1, wherein:
receiving the context for the application at the application runtime comprises:
receiving the context that was gathered by one or more client context providers;
receiving the context that identifies one or more of:
a data center;
an availability zone; or
a geographic location associated with the application;
receiving the context that identifies an availability zone associated with the application;
receiving the context that identifies a geographic zone associated with the application.
accessing the previously stored metadata for the application comprises:
accessing the previously stored metadata indicating a data type for each variable of the plurality of variables;
routing the context to one or more pluggable configuration providers comprises routing the context to one or more of:
an experimentation context provider;
a personalization context provider; or
an identity context provider;
at least one of the values of the one or more potential values comprise values from an emergency configuration provider, the one or more pluggable configuration providers, comprising the emergency configuration provider;
the emergency configuration provider comprises a highest priority of the priorities associated with the one or more pluggable configuration providers;
analyzing the operational data and the value tracked of the one or more potential values for each variable of the plurality of variables comprises providing automated feedback and providing manual feedback from a business optimization service; and
the updated configuration is further based at least in part on the automated feedback and the manual feedback.

15. A computer program product for use at a computer system, the computer program product comprising:
one or more computer storage devices having stored thereon computer-executable instructions that, when executed at a processor, cause the computer system to:
receive context for an application at application runtime, the context defining an operating environment where the application is to run; access previously stored metadata for the application, the previously stored metadata identifying a plurality of variables used to configure the application at the application runtime;
select one or more pluggable configuration providers based at least in part on the context;
route the context to the one or more pluggable configuration providers selected, each of the one or more pluggable configuration providers selected configured to deduce one or more potential values for one or more of the plurality of variables identified based at least in part on the context;
for each variable in the plurality of variables identified:
receive the one or more potential values for the variable from at least one of the one or more pluggable configuration providers selected; and
select a value of the one or more potential values to assign to the variable based at least in part on priorities associated with the one or more pluggable configuration providers selected;
return a configuration to the application, the configuration based at least in part on the value selected of the one or more potential values for each variable of the plurality of variables, the configuration configuring the application for execution in the operating environment;
track the value selected of the one or more potential values for each variable of the plurality of variables;
collect operational data based on the configuration;
analyze the operational data and the value tracked of the one or more potential values for each variable of the plurality of variables; and
return an updated configuration to the application, the updated configuration based at least in part on the analyzing the operational data and the value tracked of the one or more potential values for each variable of the plurality of variables.

16. The computer program product of claim 15, wherein:
the computer-executable instructions that cause the computer system to receive the context for the application comprise computer-executable instructions that cause the computer system to:
receive the context that was gathered by one or more client context providers.

17. The computer program product of claim 11, wherein:
the computer-executable instructions that cause the computer system to access the previously stored metadata for the application comprise computer-executable instructions that cause the computer system to:
access the previously stored metadata indicating a data type for each variable of the plurality of variables.

18. The computer program product of claim 15, wherein:
the computer-executable instructions that cause the computer system to select the value of the one or more potential values to assign to the variable comprise computer-executable instructions that cause the computer system to:
override values from the one or more of the pluggable configuration providers selected to select the value of the one or more potential values to assign to the variable.

19. The computer program product of claim 15, wherein:
the computer-executable instructions that cause the computer system to select the value of the one or more potential values to assign to the variable comprise computer-executable instructions that-cause the computer system to:
aggregate the value provided from each of the one or more pluggable configuration providers selected to select the value of the one or more potential values to assign to the variable.

20. The computer program product of claim 15, further comprising computer-executable instructions that, when executed, cause the computer system to:
compose the configuration from the value selected of the one or more potential values for each variable of the plurality of variables.

21. The computer program product of claim 15, wherein:
the computer-executable instructions that cause the computer system to receive the context for the application comprise computer-executable instructions that cause the computer system to analyze the operational data and the value tracked of the one or more potential values for each variable of the plurality of variables by providing automated feedback; and
the updated configuration is further based at least in part on the automated feedback.

22. The computer program product of claim 15, wherein:
the computer-executable instructions that cause the computer system to receive the context for the application comprise computer-executable instructions that cause the computer system to analyze the operational data and the value tracked of the one or more potential values for each variable of the plurality of variables by providing manual feedback from a business optimization service; and the updated configuration is further based at least in part on the manual feedback.

23. The computer program product of claim 15, wherein:
the computer-executable instructions that cause the computer system to receive the context for the application comprise computer-executable instructions that cause the computer system to analyze the operational data and the value tracked of the one or more potential values for each variable of the plurality of variables by providing automated feedback and manual feedback from a business optimization service; and
the updated configuration is further based at least in part on the automated feedback and the manual feedback.

24. The computer program product of claim 15, wherein:
the computer-executable instructions that cause the computer system to receive the context for the application comprise computer-executable instructions that cause the computer system to analyze the operational data and the value tracked of the one or more potential values for each variable of the plurality of variables by providing automated feedback and manual feedback from a business optimization service;
the computer-executable instructions that cause the computer system to access the previously stored metadata for the application comprise computer-executable instructions that cause the computer system to:
  access the previously stored metadata indicating a data type for each variable of the plurality of variables;
the computer-executable instructions that cause the computer system to select the value of the one or more potential values to assign to the variable comprise computer-executable instructions that cause the computer system to:
  override values from the one or more of the pluggable configuration providers selected to select the value of the one or more potential values to assign to the variable;
the computer-executable instructions that cause the computer system to select the value of the one or more potential values to assign to the variable comprise computer-executable instructions that-cause the computer system to:
  aggregate the value provided from each of the one or more pluggable configuration providers selected to select the value of the one or more potential values to assign to the variable;
and
the updated configuration is further based at least in part on the automated feedback and the manual feedback.

25. A system, the system comprising:
one or more processors;
system memory;
a configuration manager, the configuration manager configured to compose configurations used to configure applications;
a client, the client including an application that is to be executed in an operating environment, the operating environment defined in a context, the application including code and annotations; and
a metadata processor, the metadata processor configured to:
  access metadata from the annotations, the metadata including a plurality of variables that are to be used to configure the application at application runtime and defining a data type for each variable of the plurality of variables;
  and
  send the metadata to the configuration manager;
wherein:
  the configuration manager is configured to receive and store the metadata;
  the configuration manager includes one or more computer storage devices having stored thereon computer-executable instructions representing a routing module, one or more pluggable configuration providers, and a value selection module, wherein the routing module is configured to:
    receive the context at the application runtime;
    select the one or more pluggable configuration providers based at least in part on the context; and
    route the context to the one or more pluggable configuration providers selected;
  each of the one or more configuration providers selected are configured to:
    access the metadata for the application; and
    deduce one or more potential values for one or more of the plurality of variables to the value selection module based at least in part on the context, each of the one or more potential values being formatted to an appropriate one of the data type;
  the value selection module is configured to:
  for each variable of the plurality of variables:
    receive the one or more potential values for the variable from at least one of the one or more pluggable configuration providers selected; and
    select a value of the one or more potential values to assign to the variable; and
  the configuration manager is further configured to:
    compose a configuration for the application from the one or more potential values selected for each variable of the plurality of variables;
    return the configuration to the application;
    track the value of the one or more potential values for each variable of the plurality of variables;
    collect operational data based on the configuration;
    analyze the operational data and the value tracked of the one or more potential values for each variable of the plurality of variables; and
    return an updated configuration to the application, the updated configuration based at least in part on the analyzing the operational data and the value tracked of the one or more potential values for each variable of the plurality of variables.

26. The system of claim 25, wherein the one or more pluggable configuration providers include one or more of:
an experimentation context provider;
a personalization context provider;
an identity context provider;
a locale context provider;
a time zone context provider; or
a business rules context provider.

27. The system of claim 25, wherein the context indicates one or more of:
a data center where the application is to run;
an availability zone for the application; or
a geographical location where the application is to run.

28. The system of claim 25, further comprising one or more client context providers configured to gather portions of the context.

29. The system of claim 25, wherein the application is a cloud based electronic commerce application.

30. The system of claim 25, wherein the configuration manager is further configured to:
   analyze the operational data and the value tracked of the one or more potential values for each variable of the plurality of variables by providing automated feedback; and
   the updated configuration is further based at least in part on the automated feedback.

31. The system of claim 25, wherein the configuration manager is further configured to:
   analyze the operational data and the value tracked of the one or more potential values for each variable of the plurality of variables by providing manual feedback from a business optimization service; and
   the updated configuration is further based at least in part on the manual feedback.

32. The system of claim 25, wherein the configuration manager is further configured to:
   analyze the operational data and the value tracked of the one or more potential values for each variable of the plurality of variables by providing automated feedback and providing manual feedback from a business optimization service; and
   the updated configuration is further based at least in part on the automated feedback and the manual feedback.

33. The system of claim 25, wherein:
   the configuration manager is further configured to:
   analyze the operational data and the value tracked of the one or more potential values for each variable of the plurality of variables by providing automated feedback and providing manual feedback from a business optimization service;
   the one or more pluggable configuration providers include one or more of:
      an experimentation context provider;
      a personalization context provider;
      an identity context provider;
      a locale context provider;
      a time zone context provider; or
      a business rules context provider;
   the context indicates one or more of:
      a data center where the application is to run;
      an availability zone for the application; or
      a geographical location where the application is to run; and
   the updated configuration is further based at least in part on the automated feedback and the manual feedback.

* * * * *